Oct. 29, 1940.   G. CLARK ET AL   2,219,720
GRINDING, PULVERIZING, AND THE LIKE TREATMENT OF MATERIALS
Original Filed March 29, 1935   5 Sheets-Sheet 1
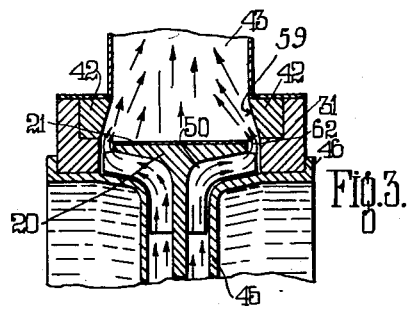
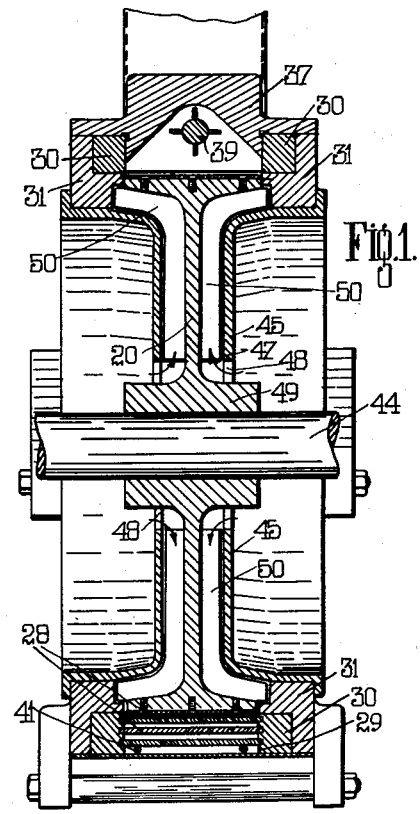
Inventors:
Geoffrey Clark
Walter Clark
By: Mason & Porter
Attorneys Oct. 29, 1940.  G. CLARK ET AL  2,219,720
GRINDING, PULVERIZING, AND THE LIKE TREATMENT OF MATERIALS
Original Filed March 29, 1935  5 Sheets-Sheet 2
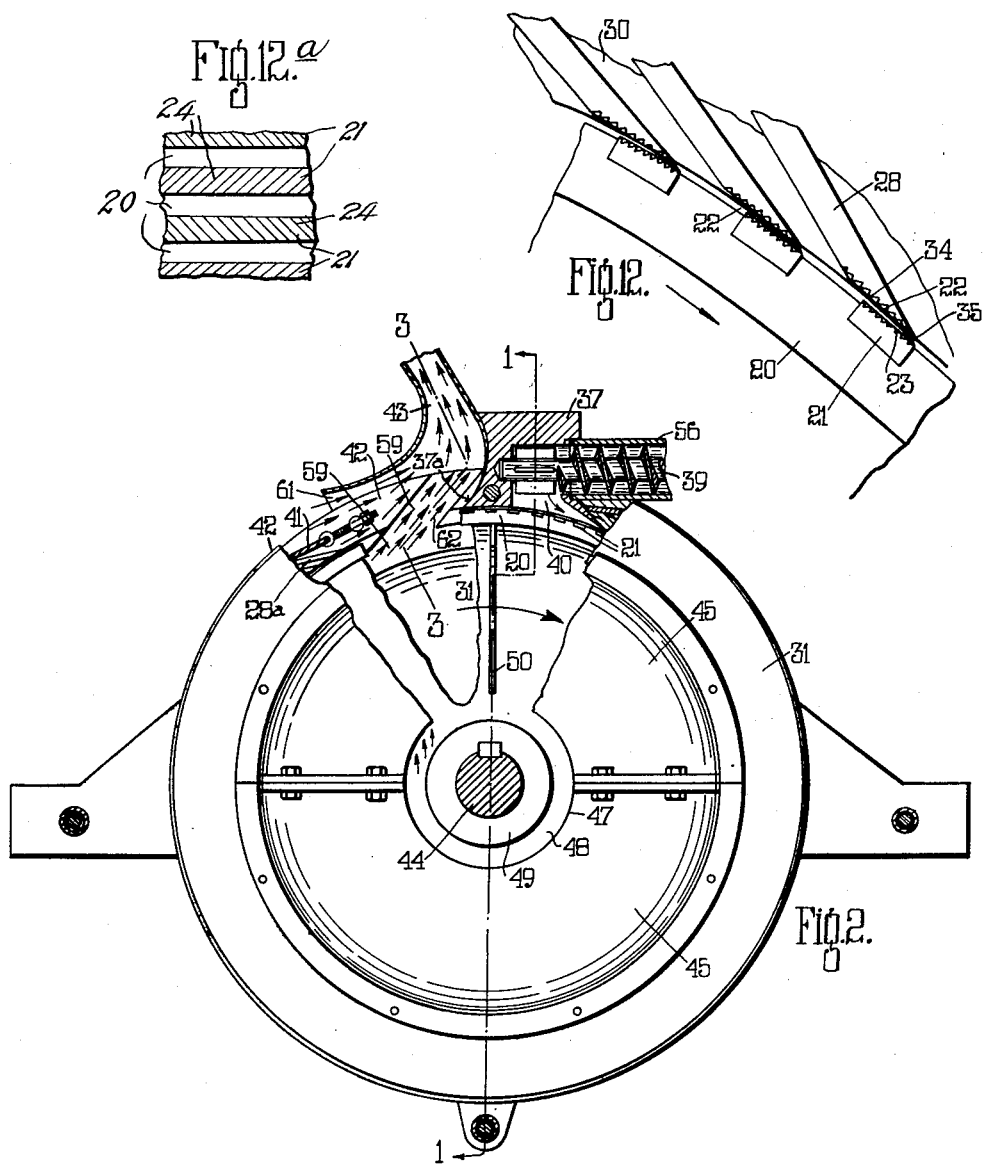

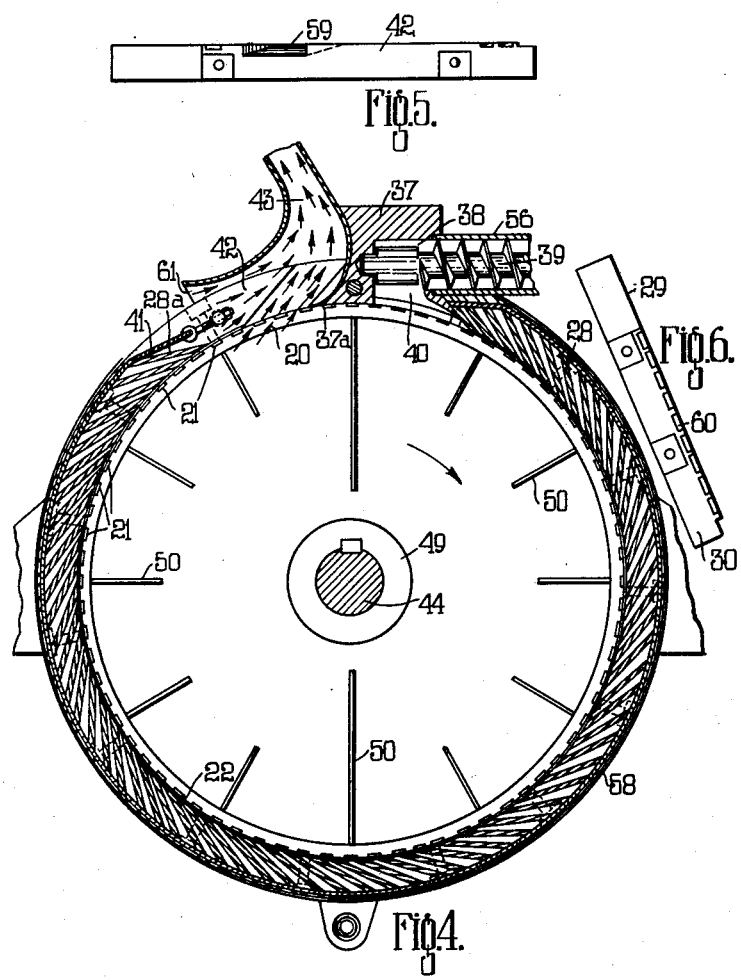

Oct. 29, 1940.                G. CLARK ET AL                  2,219,720
           GRINDING, PULVERIZING, AND THE LIKE TREATMENT OF MATERIALS
                    Original Filed March 29, 1935      5 Sheets-Sheet 4
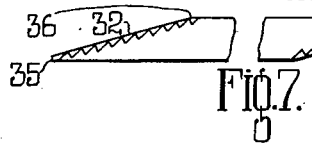
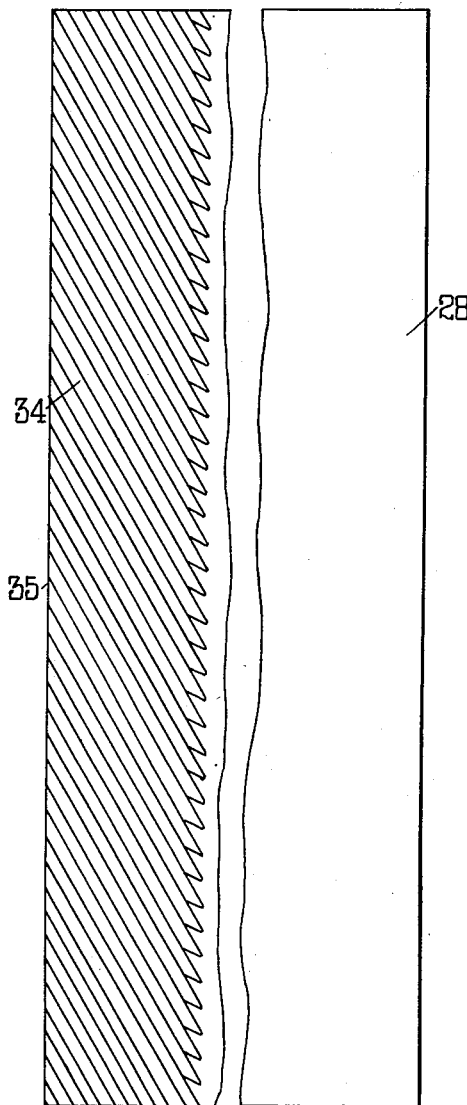
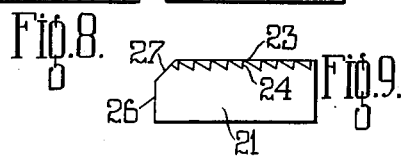
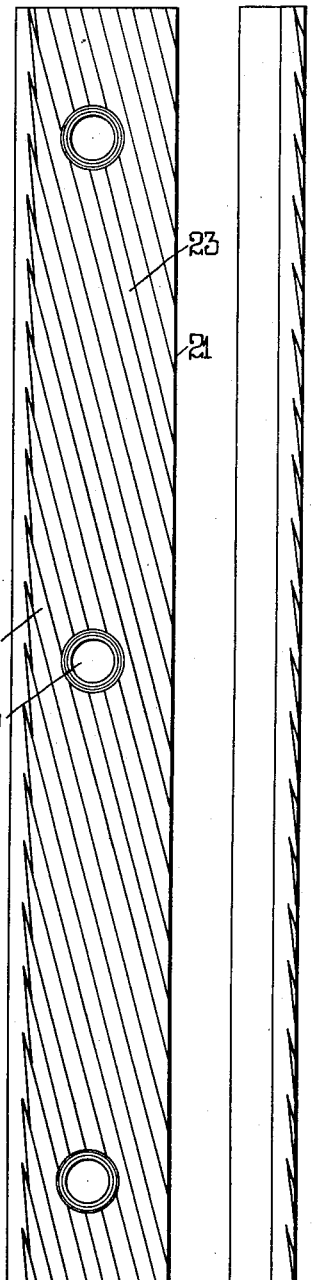

Patented Oct. 29, 1940

2,219,720

UNITED STATES PATENT OFFICE

2,219,720

GRINDING, PULVERIZING, AND THE LIKE TREATMENT OF MATERIALS

Geoffrey Clark and Walter Clark, Kingston-upon-Hull, England

Application March 29, 1935, Serial No. 13,778. Renewed November 27, 1939. In Great Britain November 5, 1934

16 Claims. (Cl. 83—14)

The present invention relates to the grinding, pulverizing and the like treatment of materials such as, for example, cereals and minerals, or again granular materials such as sugar and has for its object the reduction of such material to predetermined size and where desired to a very fine degree.

The invention includes the process of passing the material rapidly between relatively rotating surfaces, one of which is part of a cylinder whilst the other is substantially tangential thereto and relieving the material of its grinding pressure intermittently throughout its circumferential passage between the surfaces.

In carrying out this process the material to be treated is passed between a rotor in the form of a drum or pulley having grinding blades on its periphery and a stator made up of spaced blades surrounding the periphery of the rotor, the ends of the rotor having free access to the atmosphere. In this way a relatively thin annulus having a breadth equal to the axial length of the rotor may be provided as the treatment chamber for the material, the said chamber having a free circumferential discharge outlet which is separated from the inlet to the chamber by means of a cut out on the stator. As a result the apparatus may be of simple form without any complicated means for exhausting the material and preventing the chamber from becoming choked during the reduction treatment.

The rotor grinding blades are mounted on the rotary drum or pulley to extend across its peripheral face and to project radially therefrom to a sufficient extent to form neutral zones in the spaces between successive blades, whilst the stator blades are supported in spaced relationship between side members of a fixed frame to constitute, with the inlet and exhaust and the cut out between them, the complete outer periphery of the annular chamber for the treatment of the material, both as regards its circumference and axial length.

The rotor is so arranged that its ends have free access to the air, and it is only near their extreme diameter that they come into close proximity to the side stator members.

Suitable projections or attachments are provided for securing the annular side members of the stator to the fixed base frame, whilst for the purpose of simplicity of construction the stator blades fit into slots or grooves formed in or upon segmental blocks, which are detachably but rigidly mounted upon the annular side members with the ends of the stator blades resting on said side members. When desired means are provided for adjusting the blades in their operative position to vary their degree of proximity with the rotor blades.

The annular side members project beyond the ends of the rotor and radially inwards thereof to a limited extent without destroying the freedom of the rotor to access with the atmosphere, whilst if desired, cover plates formed of reticulate or perforated material may be provided between the axis of rotation of the rotor and the side members of the stator to prevent accidental contact of the operator with the rotor. It is preferred, however, that these cover plates be solid, i. e., of imperforated material, and extend from the side members towards the rotor shaft to leave an annular gap around said shaft, which space is sufficient for the inlet passage of a supply of air, for cooling or heating purposes, to the ends of the rotor and for the purpose of evacuating that portion of the material forced beyond the ends of the peripheral face of the rotor. Where a pulley, as distinct from a drum type of rotor, is employed the cover plates follow the contour of the pulley, i. e., where the pulley is of T section each of the cover plates are dished.

A simple form of means for holding the stator blades in position consists of one or more cables tautened over the outer edges of the blades.

The working face of each stator blade when held in position, preferably forms an angle of between 45° and 90° from the point of contact at its tailing edge with any radius of the rotor produced beyond its peripheral track, it being appreciated that the nearer this angle approaches to 90°, the finer being the degree of grinding.

When in operation the internal pressure generated in the annular grinding space tends to force some of the feed material centripetally down the ends of the rotor; the cover plates which prevent access to the rotor ends then form cavities in conjunction with the rotor, which in time would become choked. This eventuality is avoided by arranging release ducts from near the extreme diameter of these cavities, outwardly through the annular stator members or radially through gaps in them which debouch directly into the discharge outlet.

To assist in the scavenging process of the end cavities blades or the like are mounted or formed upon the ends of the drum or the sides of the pulley constituting the rotor.

Although the material may be gravity fed, it is preferred that it is pressure fed into the inlet, carried once round and then discharged through the free outlet; thus the grinding process is carried out without the clogging effect caused by regrinding an already finished product in the same mill.

The invention is more particularly described with reference to the accompanying drawings, in which—

Figure 1 is a sectional elevation of an apparatus constructed according to the present invention taken, for example, on the line 1—1 of Figure 2.

Figure 2 is a side elevation of the apparatus according to Figure 1 but with a portion broken away to show means for feeding the material to and exhausting it from the annular treatment chamber between the rotor and stator blades.

Figure 3 is a fragmentary sectional view taken on the line 3—3 of Figure 2.

Figure 4 is a part sectional side view through the rotor and stator.

Figure 5 is an inverted plan view of one of the segments of an annular side member in which ducts are formed for the passage of a stream of air for exhausting the material from the annular space between the stator and the ends of rotor.

Figure 6 is an inverted plan view of each of the remaining segments of one of the annular side members for supporting the stator blades.

Figure 7 is an end view of one of the stator blades.

Figure 8 is a corresponding plan view.

Figure 9 is an end view of one of the rotor blades.

Figure 10 is a corresponding plan view.

Figure 11 is a corresponding edge view.

Figure 12 is an enlarged view showing the angularity between the operative faces of the fixed blades and the stator blades with the space between the blades constituting the passage for the material.

Figure 12a is an enlarged fragmentary plan view of the rotor surface, showing the inclination of the teeth on the rotor blades.

Figure 13:
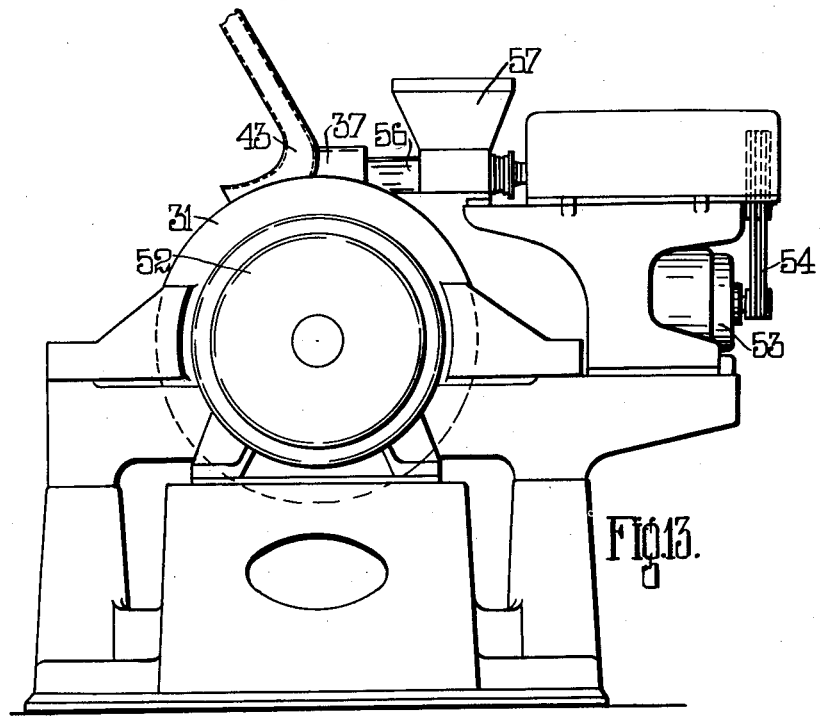
Figure 13 is an end elevational view of the apparatus as a whole.

In the construction according to the drawings the material to be treated is passed through an annular treatment chamber 22 formed between a pulley type of rotor 20 having grinding blades 21 on its periphery and a stator made up of spaced blades 28 surrounding the periphery of the rotor, substantially in the form of a louvre.

The rotor blades consist of rectangular elements having a cutting face 23 formed by inclined teeth 24, the teeth of adjacent blades being inclined in opposite directions to axially reciprocate the material and thus keep it in a free state as it is passing circumferentially through the treatment chamber 22, the effect of one blade being to cause the material when passing circumferentially through the treatment chamber to move towards one end of the rotor whilst the next blade tends to cause the material to move towards the opposite end.

These blades are mounted in slots circumferentially spaced apart around and formed in the rotor periphery to extend across the rotor from one edge to the other and to project radially therefrom to a slight extent. They are retained in said slots in the rotor periphery by screw or the like means which engage in holes 25 formed in the blades.

It will be noticed in Figure 9 that the leading edge 26 of each rotor blade is chamfered at 27 so that there is no danger of the material clogging against the blades as the rotor is rotated.

The stator consists of a number of blades 28 arranged in circumferentially spaced relationship within inclined slots 60 formed on the inner faces 29 of segmental blocks 30 which in turn are secured, such as by bolt and nut or screw means to annular side members 31, the latter being mounted upon the frame of the machine.

Any means may be provided for adjusting the stator blades 28 within the slots formed in the inner faces 29 of the segmental blocks 30, in order to vary the degree of proximity of the operative faces of said stator blades with the operative faces of the rotor blades and thus to regulate the cross sectional area of the annular treatment chamber 22 for the material.

The annular side members 31 with the segmental blocks seated in the step on the inner faces of said members are spaced apart axially by a distance substantially equal to that of the rotor so that the stator blades 28 supported between said segmental blocks of the annular side members, constitutes the outer boundary of the treatment chamber and the effective face of the stator without the addition of any other means whatsoever and as such, said stator blades form the outer periphery with the rotor constituting the inner periphery of the annular treatment chamber 22 to which material is fed in order to be reduced to powder form.

In the construction according to the drawings, and as will be seen from a perusal of Figures 7 and 8, each stator blade has tapered end faces 32, 33, which constitute the operative faces of the blade, said faces 32, 33 having teeth 34 formed thereon with the edge 35 constituting the rear edge of the blade, that is to say, on rotation of the rotor, material is caused to pass from the leading edge 36 of each stator blade towards the rear edge 35.

The operative face of each stator blade when the blades are held in position between the segmental blocks preferably is substantially tangential to the periphery of the rotor, but said operative face may take up any angle between 45° and 90° from the point of contact at its rear edge with any radius of the rotor produced beyond its periphery.

It will be appreciated that in the construction of stator blade as illustrated in the drawings, the sole object of providing a tapered face at each end is to permit the blade to be reversed in its mounting between segmental blocks when one of the operating faces has become worn, whilst again a stator blade having cutting edges as described and illustrated is particularly suitable for grinding cereals and other substances which require cutting. If desired, however, the operative faces of both the rotor and stator blades may be plain, or be constituted by teeth set at a releasing instead of a cutting angle, should impact pulverizing only be required. Where teeth are formed on the operative face or faces of the stator blades, then as in the case of the rotor blades, the teeth on the operative faces of adjacent stator blades are inclined in the opposite direction.

In this way the material is given a reciprocating axial movement towards the ends of the rotor during its circumferential path of travel through the annular chamber between the rotor and the stator blades and is thus kept in a free state during this path of travel without any tendency to form a solid mass.

Where maximum grinding is to be effected, the operative faces 32 of the stator blades 28 extend substantially normally to the radii of the rotor in order to provide the maximum arc or length of contact of the material with each blade face when passing circumferentially between the stator blades and the rotor.

If desired, however, where the section of each blade is relatively large such as, for example, in the case of bars of rectangular, triangular or other suitable section the working or operative faces of the blades may be constituted by their sides or faces instead of providing a tapered face adjacent the ends as illustrated in Figure 7.

A cut out 37 is mounted on the top of the annular side members 31 of the frame to span the same, said cut out being recessed at 38 to receive one end of a worm or other conveyor 39 for feeding material through the opening 40 into the annular treatment chamber between the rotor and the stator blades. This cut out member 37 also constitutes the required means to which one end of a pair of cables 41 for holding the stator blades in their operative position around the rotor is secured, said cables passing around the outer edges of the stator blades and being adjustably secured to segmental blocks 42 in the region of the exhaust for the material from the treatment chamber.

The exhaust port from the treatment chamber which, as will be seen, is substantially equal to the width of the rotor is circumferentially constituted by the distance between the last stator blade 28a and the edge 37a of the cut out 37 continued into a conduit 43 which is mounted in rear of the inlet 40 to the chamber so that the material travels in clockwise direction as represented in the drawings from the inlet 40 circumferentially around the treatment chamber and thence upwardly through the exhaust 43, the material thus passing around the treatment chamber once and once only.

It will be seen from the drawings that as the material exhausts from the treatment chamber between the last stator blade 28a and the edge 37a of the cut out, it escapes tangentially into the duct 43 and induces air from the atmosphere through an opening 61, said free air functioning as an atomiser. The atomising effect is also assisted by the air streams passing from the ends of the rotor through the ports 62, 59 into the duct 43.

In order to assist exhausting of the material but with the main object of forming an air seal for the ends of the treatment chamber and preventing any material being forced out of the treatment chamber centripetally down the sides or ends of the rotor, the latter is open to the atmosphere at its sides or ends in the region of its shaft 44, a cover plate preferably formed of two, half portions 45 being connected at its outer periphery 46 to the annular side members 31 and extending to a position removed from the shaft 44 as shown at 47 in order to leave an annular space 48 around the hub 49 of the rotor on the shaft 44.

Vanes 50 are mounted on the sides of the rotor where this is of pulley form or on the radial ends of the rotor where this is of drum form in order to induce an air stream inwardly through the space 48 thence outwardly through the passages between the rotor 20 and the cover plates 45 and thence through slots 62 in the inner face of the upper portion of the side members 31, tapered slots 59 in the segmental blocks 42 and thence merging into the exhaust conduit 43.

This induced air stream, therefore, not only prevents choking up of the plant in the region of the side edges of the rotor and as such constitutes an air seal at each end of the rotor so as to prevent the material from escaping from the ends of the treatment chamber, and also contributes towards inducing the treated material to leave the peripheral face of the rotor, through the main exhaust port between the last stator blade 28a and the edge 37a of the cut out. The speed of rotation of the rotor causes the vanes 50 on the rotor sides or ends to operate as fans.

If desired, the open annulus 48 on each end of the rotor may have a covering of reticulated or perforated material but where there is no possibility of entrance of foreign matter or accident to workmen, this space is left completely open.

Where a pulley type of rotor is used as shown in the drawings, then the cover plate 45 which extends from the periphery of the casing part of the way towards the shaft may be of dished formation as shown in Fig. 1 in order to follow the contour of the pulley rotor, but where the rotor is of drum form, then these cover plates may be flat.

The circumferential spacing apart of the rotor blades and also of the fixed blades is determined in accordance with the nature of the material to be treated, the output from the mill and the degree of fineness required, whilst the same applies to the cross sectional area of the annular treatment chamber between the operative faces of the rotor and the stator blades. For example assuming other factors constant the increased axial length of the rotor face and the effective face of the stator increases capacity; increase of speed of the rotor increases the degree of fineness; decrease of proximity of individual blade spacing of either stator or rotor increases the degree of fineness whilst the same applies to increasing the number of teeth per unit area of blade face.

Figure 14:
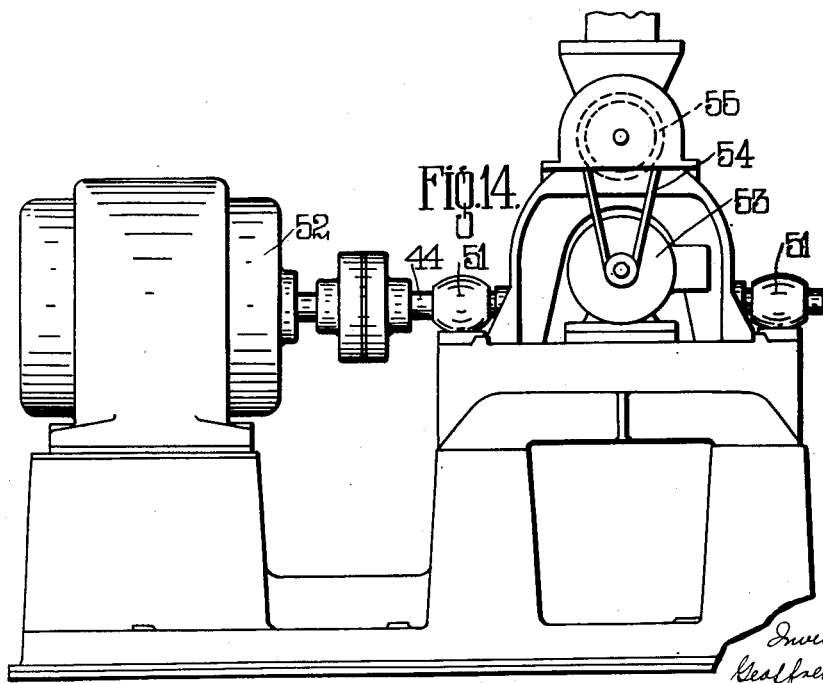
Figure 14 is a corresponding side view.

In the general arrangement illustrated in Figures 13 and 14 the rotor shaft 44 is journalled in bearings 51 on the bed of the machine and is driven from an electric or other motor 52 whilst the worm 39 which constitutes the pressure feed for the material into the treatment chamber is driven from a motor 53 through a belt 54 and pulley 55, the inlet hopper for the supply of material to the chamber 56 within which the feed worm 39 operates, being shown at 57.

It will be appreciated of course, that instead of providing a forced feed for the material into the treatment chamber the material may be gravity fed thereto whilst in the arrangement shown in the drawings a shield 58 is provided around the cables 41 and the outer edges of the stator blades to prevent accident or the entrance of foreign matter into the treatment chamber. As regards the action of the stator and rotor blades on the material this shield 58 is of little or no service except to form an air chamber around the grinding surfaces.

It will be appreciated that by reversing the angle of incidence of the teeth on the grinding faces a greater pulverizing or disintegrating effect is accomplished. This arrangement is applicable to the treatment of minerals.

If desired, a number of mills may be arranged in series so that the material exhausted from one may be fed through the inlet of another for further grinding, crushing, pulverizing or cutting, the material passing circumferentially through the treatment chamber of each mill, once only.

We declare that what we claim is:

1. Apparatus for the reduction of material to powder form, comprising a rotor having blades disposed around the periphery thereof in circumferentially spaced relationship, a stator having circumferentially spaced blades substantially surrounding the periphery of said rotor and forming therewith a thin annular treatment chamber, means for feeding the material to the thin annular treatment chamber, means for maintaining an air seal at the edges of the annular treatment chamber whereby to prevent the escape of materal therefrom, a cut-out element disposed in rear of the feeding point and having a wall portion spaced from the last stator blade, and means including the said wall portion of the cut-out element and a member having at least a portion thereof located between the said last stator blade and said wall portion for providing an exhaust passage to permit the escape of material from between the said last stator blade and said cut-out element, and said passage being constructed and arranged to induce an external air stream independent of the air seal for creating a vacuum whereby to aid in positively exhausting the material after it has passed circumferentially once through the annular treatment chamber.

2. Apparatus for the reduction of material to powder form, comprising a rotor having blades disposed around the periphery thereof in circumferentially spaced relationship, a stator having circumferentially spaced loosely mounted blades substantially surrounding the periphery of said rotor and forming therewith a thin annular treatment chamber, means for feeding the material to the anular treatment chamber, means for maintaining an air seal at the edges of the annular treatment chamber whereby to prevent the escape of material therefrom, means including a cut-out element for providing an exhaust for the material in rear of the feeding point, and radially contractible means surrounding said stator and secured at one end to said cut-out element and at the opposite end in the region of said exhaust for exerting a substantially radial inward pressure on the stator blades whereby to maintain the said stator blades in position.

3. Apparatus for the reduction of material to powder form comprising a rotor having an annular periphery with the sides thereof accessible to the atmosphere, blades mounted in circumferentially spaced relationship on said annular periphery, a stator having circumferentially spaced blades surrounding the periphery of said rotor and substantialy co-extensive therewith laterally to form a thin annular treatment chamber, means including cables for holding the blades of said stator in position, means for feeding the material to said annular treatment chamber, means for maintaining an air seal between the edges of the annular periphery of said rotor and said stator whereby to isolate the annular treatment chamber and prevent the escape of material therefrom, and means for exhausting the material after it has passed circumferentially through the annular treatment chamber.

4. Apparatus for the reduction of material to powder form comprising a rotor having an annular periphery with the sides thereof accessible to the atmosphere, blades mounted in circumferentially spaced relation on the annular periphery of said rotor, a stator having circumferentially spaced blades surrounding the periphery of said rotor to form a thin annular treatment chamber between the rotor and the stator, means including cables for holding the blades on said stator in position, means for feeding the material to said annular treatment chamber, means for maintaining an air seal between the edges of the annular periphery of said rotor and said stator whereby to isolate the annular treatment chamber and prevent the escape of material therefrom, and means including a cut-out element disposed in rear of said feeding point for positively exhausting all of the material after it has passed once and once only through the annular treatment chamber.

5. Apparatus for the reduction of material to powder form comprising a rotor having an annular periphery, blades mounted in circumferentially spaced relationship on the periphery of said rotor, a stator having circumferentially spaced blades surrounding the periphery of said rotor and forming therewith a thin annular treatment chamber, means for feeding the material to the annular treatment chamber, means for maintaining an air seal at the edges of the annular treatment chamber whereby to prevent the escape of material therefrom, each of said rotor blades being disposed parallel to the axis of the rotor and having teeth formed thereon, the top cutting edges of said teeth extending in substantially parallel lines with the top edges of the teeth of adjacent blades inclined in opposite directions toward the opposite ends of said rotor whereby to axially reciprocate the material during its passage through the annular treatment chamber, and means for positively exhausting all of the material after it has passed once and once only through the annular treatment chamber.

6. Apparatus for the reduction of material to powder form comprising a rotor having an annular periphery, blades mounted in circumferentially spaced relationship on the periphery of said rotor, a stator having circumferentially spaced blades surrounding the periphery of said rotor and forming therewith a thin annular treatment chamber, means for feeding the material to the annular treatment chamber, means for maintaining an air seal at the edges of the annular treatment chamber whereby to prevent the escape of material therefrom, each of said rotor blades being disposed parallel to the axis of the rotor and having teeth formed thereon, the top cutting edges of said teeth extending in substantially parallel lines with the top edges of the teeth of adjacent blades inclined in opposite directions toward the opposite ends of said rotor whereby to axially reciprocate the material during its passage through the annular treatment chamber, and means including a cut-out element disposed in rear of the feeding point and intimately associated with said rotor for positively exhausting the material after it has passed circumferentially once through the annular treatment chamber.

7. Apparatus for the reduction of material to powder form comprising a rotor having an annular periphery, blades mounted in circumferentially spaced relationship on the periphery of said rotor, a stator having circumferentially spaced blades surrounding the periphery of said rotor and forming therewith a thin annular treatment chamber, means for feeding the material to the annular treatment chamber, means for maintaining an air seal at the edges of the annular treatment chamber whereby to prevent the escape of material therefrom, each of said rotor blades being disposed parallel to the axis of the rotor and having teeth formed thereon, the top cutting edges of said teeth extending in substantially parallel lines with the top edges of the teeth of adjacent blades inclined in opposite directions toward the opposite ends of said rotor whereby to axially reciprocate the material during its passage through the annular treatment chamber, means including a cut-out element disposed in rear of the feeding point and intimately associated with said rotor for positively exhausting the material after it has passed circumferentially once through the annular treatment chamber, and connecting means having one end thereof secured to said cut-out element and surrounding said stator for holding the blades of said stator in position.

8. Apparatus for the reduction of material to powder form comprising a rotor having an annular periphery, blades mounted in circumferentially spaced relationship on the periphery of said rotor, a stator having circumferentially spaced blades surrounding the periphery of said rotor and forming therewith a thin annular treatment chamber, each of said stator blades having teeth formed thereon, the top cutting edges of said teeth extending in substantially straight parallel lines with the top edges of the teeth of adjacent blades inclined in opposite directions toward the opposite ends of said rotor whereby to axially reciprocate the material during its passage through the annular treatment chamber, means for feeding the material to the annular treatment chamber, means for maintaining an air seal at the edges of the annular treatment chamber whereby to prevent the escape of material therefrom, and means including a cut-out element disposed in rear of the feeding point and intimately associated with said rotor for positively exhausting the material after it has passed circumferentially once through the annular treatment chamber.

9. Apparatus for the reduction of material to powder form comprising a rotor having an annular periphery, blades mounted in circumferentially spaced relationship on the periphery of said rotor, a stator having circumferentially spaced blades surrounding the periphery of said rotor and forming therewith a thin annular treatment chamber, means for feeding the material to the annular treatment chamber, means for maintaining an air seal at the edges of the annular treatment chamber whereby to prevent the escape of material therefrom, the blades of both said rotor and said stator having teeth formed thereon, the top cutting edges of said teeth extending in substantially parallel lines with the top edges of the teeth of adjacent blades inclined in opposite directions toward the opposite ends of said rotor whereby to axially reciprocate the material during its passage through the annular treatment chamber, and means for positively exhausting all of the material after it has passed once and once only through the annular treatment chamber.

10. Apparatus for the reduction of material to powder form comprising a rotor having an annular periphery provided with a set of blades, said blades being mounted in circumferentially spaced relationship on the periphery of said rotor, a stator having a set of circumferentially spaced blades surrounding the periphery of said rotor and forming therewith a thin annular treatment chamber, means for feeding the material to the annular treatment chamber, means for maintaining an air seal at the edges of the annular treatment chamber whereby to prevent the escape of material therefrom, at least one of said sets of blades having teeth formed thereon, the top cutting edges of said teeth extending in substantially parallel lines with the top edges of the teeth of adjacent blades inclined in opposite directions toward the opposite ends of said rotor whereby to axially reciprocate the material during its passage through the annular treatment chamber, means for positively exhausting all of the material after it has passed once and once only through the annular treatment chamber, and cable means for holding the blades of said stator in position.

11. Apparatus for the reduction of material to powder form, comprising a rotor having an annular periphery, a stator having circumferentially spaced blades substantially surrounding the periphery of said rotor and forming therewith a thin annular treatment chamber, means providing spaced sets of teeth around the periphery of said rotor, the top cutting edges of said teeth extending in substantially straight parallel lines with the top edges of the teeth of adjacent sets being inclined in opposite directions toward the opposite ends of the periphery of said rotor whereby to axially reciprocate the material during its passage through the annular treatment chamber, means for feeding the material to the thin annular treatment chamber, means for maintaining an air seal at the edges of the annular treatment chamber whereby to prevent the escape of material therefrom, and means for exhausting the material after it has passed through the thin annular treatment chamber.

12. Apparatus for the reduction of material into powder form comprising a frame, a rotor mounted for rotation on said frame and having sides open to atmosphere, means for driving said rotor, blades mounted in circumferentially spaced relationship on the periphery of said rotor, annular side members on said frame at said rotor ends, a plurality of segments mounted on said annular side members and having slots formed on their inner faces, circumferentially spaced blades constituting a stator and located in said slots of said segmental members with the ends of their operative faces resting upon said side annular members to form with said rotor an annular chamber for the passage of material in film form between said rotor and stator, cables around said blades to retain said blades in fixed position within said slots, means to feed material into said annular chamber, means for providing an air seal at the ends of said annular chamber and means to exhaust said material after it has passed circumferentially through said chamber.

13. Apparatus for the reduction of material into powder form comprising a frame, a casing having ends open to atmosphere, a rotor mounted for rotation on said frame, within said casing, blades on said rotor ends to induce a stream of air axially into said casing and radially outwardly from the axis of said rotor towards the periphery thereof to form an air seal at the ends of said rotor, means for driving said rotor, blades mounted in circumferentially spaced relationship on the periphery of said rotor, annular side members on said frame at said rotor ends, a plurality of segments mounted on said annular side members and having slots formed on their inner faces, circumferentially spaced blades constituting a stator and located in said slots of said segmental members with the ends of their operative faces resting upon said annular side members to form with said rotor an annular chamber for the passage of material in film form between said rotor and stator, cables around said blades to retain said blades in fixed position within said slots, means to feed material into said annular chamber and means for exhausting said material from said chamber at a circumferential part thereof.

14. Apparatus for the reduction of material to powder form comprising a rotor having an annular periphery with the sides thereof accessible to the atmosphere, blades mounted in circumferentially spaced relationship on the periphery of said rotor, fixed annular side members at each side of said rotor and extending to a point immediately adjacent the outer peripheral edge thereof, a plurality of segmental members carried by said side members, a plurality of circumferentially spaced blades mounted in said segmental members and disposed around said rotor and forming with said rotor a thin annular treatment chamber, means for feeding the material into said treatment chamber, means for directing air outwardly between said annular side members and the peripheral edges of said rotor whereby to provide an air seal at the ends of said annular treatment chamber for preventing the escape of material therefrom, means for exhausting the material from said annular treatment chamber after it has passed circumferentially therethrough, and means including communicating slots on said annular side members and on an opposed pair of said segmental members for exhausting the air providing the air seal around the annular treatment chamber.

15. Apparatus for the reduction of material to powder form comprising a rotor having an annular periphery with the sides thereof accessible to the atmosphere, blades mounted in circumferentially spaced relationship on the periphery of said rotor, segmental members disposed around the peripheral edges of said rotor, blades constituting a stator mounted in circumferentially spaced relationship in said segmental members and forming with the rotor a thin annular treatment chamber, means for feeding material into the annular treatment chamber, a cut-out element disposed in rear of the feeding point and between an opposed pair of said segmental members, and including an exhaust passage open to the atmosphere through which material is delivered at the end of its passage through the annular treatment chamber, means for providing an air seal at the ends of the annular treatment chamber to prevent the escape of material therefrom, and means including slots in the opposed pair of segmental members in the region of said cut-out element for exhausting air providing the air seal around said annular treatment chamber.

16. Apparatus for the reduction of material into powder form comprising a rotor having an annular periphery with the sides thereof open to the atmosphere, a plurality of blades circumferentially spaced around the annular periphery of said rotor, a stator including circumferentially spaced fixed blades disposed around said rotor in close proximity thereto to provide a thin annular treatment chamber, segmental members disposed around the opposed peripheral ends of said rotor and having grooves therein for the reception of said stator blades, means including annular side members for supporting said segmental members, means for feeding material into the annular treatment chamber, a cut-out element disposed in rear of the feeding point and between an opposed pair of segmental members and including an exhaust passage through which the material is delivered at the end of its passage through the annular treatment chamber, cables extending around said stator blades for holding the same in position and secured to said cut-out element and to the said opposed pair of segmental members in the region of said cut-out element, and means for providing an air seal at the ends of said annular treatment chamber to prevent the escape of material therefrom.

GEOFFREY CLARK.
WALTER CLARK.